United States Patent [19]

Favre

[11] Patent Number: 4,473,799

[45] Date of Patent: Sep. 25, 1984

[54] APPARATUS FOR DETECTING PRESENCE OF METAL STRAND IN PAPER

[75] Inventor: Nicolas Favre, Cornaux, Switzerland

[73] Assignee: Compagnie Industrielle Radioelectrique, Gals, Switzerland

[21] Appl. No.: 25,603

[22] Filed: Mar. 30, 1979

[30] Foreign Application Priority Data

Apr. 4, 1978 [CH]  Switzerland ......................... 3597/78

[51] Int. Cl.³ ...................... G01N 27/72; G01R 33/12
[52] U.S. Cl. .................................... 324/226; 324/236
[58] Field of Search ................ 324/228, 234, 236–238, 324/226; 340/149 A; 209/534

[56] References Cited

U.S. PATENT DOCUMENTS

| | | | |
|---|---|---|---|
| 2,587,631 | 3/1952 | Kuehne | 324/234 |
| 3,319,160 | 5/1967 | Wood et al. | 324/226 |
| 3,381,217 | 4/1968 | Williamson et al. | 324/236 |
| 3,602,643 | 8/1971 | Wright, Jr. | 209/534 |
| 3,966,047 | 6/1976 | Steiner | 324/226 |
| 4,013,894 | 3/1977 | Foote et al. | 340/149 A |
| 4,130,792 | 12/1978 | Sullivan | 324/236 |

Primary Examiner—Gerard R. Strecker
Assistant Examiner—W. Snow
Attorney, Agent, or Firm—Robert E. Burns; Emmanuel J. Lobato; Bruce L. Adams

[57] ABSTRACT

Apparatus for detecting the presence of a metal strand in paper, for example in a document or bank note of which one wishes to check the authenticity, comprises means for moving the paper in front of a detection head comprising a coil a resonance circuit supplied by a high frequency source, the frequency of which is close to the resonance frequency of the circuit. The high frequency voltage is modulated by variation of the current in the resonance circuit when the strand passes the detection head. After filtering and amplification, the demodulated signal is applied to a trigger circuit to obtain a digital signal. Delivery of the digital signal to an output terminal is checked by means of a reading window, the opening of which is controlled by the means for moving the paper. The output of the detection head is also applied to a second trigger for checking maintenance of a continuous component in the signal from the resonance to verify continuity of the coil circuit.

3 Claims, 5 Drawing Figures

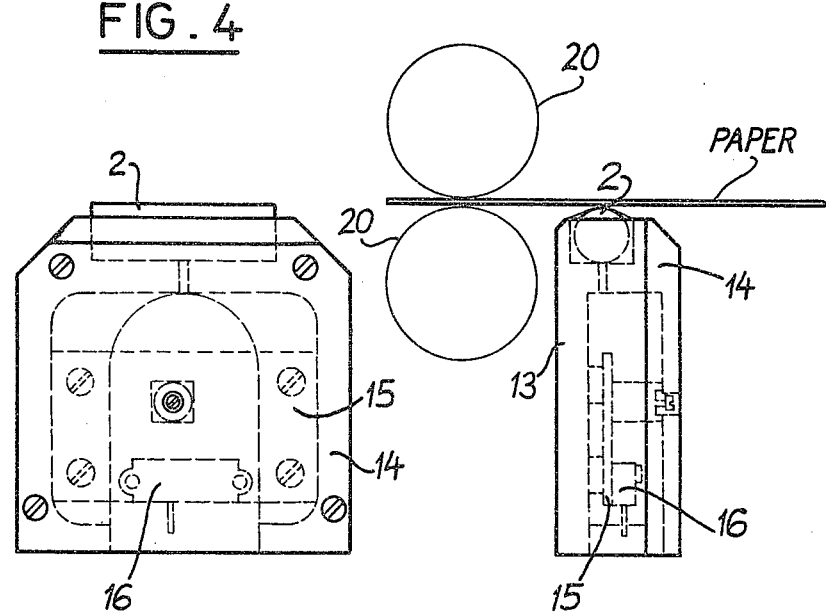

APPARATUS FOR DETECTING PRESENCE OF METAL STRAND IN PAPER

FIELD OF INVENTION

This invention relates to a method and apparatus for detecting the presence of a metal strand in paper, for example in a document or bank note of which one wishes to check the authenticity.

BACKGROUND OF THE INVENTION

Inductive proximity detectors are already known in the trade, which supply a signal when a metal member passes in the vicinity of the head. These detectors operate on an on/off basis, i.e. the resonant circuit oscillates in the absence of a metal member to be detected, the oscillation being interrupted upon the presence of a metal member in its vicinity, which has the effect of greatly increasing the apparent resistance of the inductance of the circuit, i.e. of causing a great reduction in the coefficient $\Omega = \omega L/R$. However, in practice it is not possible to use a detector of this type for detecting a strand travelling rapidly in front of the detection head, owing to the very small diameter of this strand. The signal obtained is insufficiently defined and it may also be confused with the parasite signals.

SUMMARY OF THE INVENTION

The object of the invention is to detect the passage of a metal strand, in particular a copper strand, in a reliable and certain manner.

According to the invention there is provided apparatus for detecting the presence of a metal strand in paper, by passing the paper in front of a detection head comprising a resonance circuit supplied with a high frequency current close to the resonance frequency of the circuit, such that the strand is at least approximately parallel to the axis of the coil of the circuit, demodulating the high frequency voltage modulated by the variation of the current in the resonance circuit upon the passage of the strand, and, after filtering, applying this demodulated signal to a trigger circuit in order to obtain a digital signal, and using a reading window to check for the delivery in due course of said digital signal, the opening of said reading window being controlled by means for moving the paper.

This makes it possible to obtain the desired signal with great reliability.

The frequency of the supply current for the resonance circuit is very slightly different from the resonance frequency of the circuit in order to obtain a considerable decrease in the current in the resonance circuit for a slight increase in the apparent resistance of the coil.

Thus according to the invention there is provided an apparatus for detecting the presence of a metal strand in paper, comprising a detection head comprising a coil having a ferrite core forming part of a series resonance circuit, a circuit for supplying the resonance circuit with a filtered high frequency, a circuit for demodulating high frequency voltage at terminals of the circuit modulated by the passage of the strand in front of the coil, a high-pass filter for the elimination of parasite variations of the demodulated signal, a trigger for the transformation of the analog signal into a digital signal, an amplifier and a reading window, the opening of which is controlled by a signal supplied by means for moving the paper.

BRIEF DESCRIPTION OF DRAWINGS

The invention will now be further described by way of example with reference to the accompanying drawings in which:

FIG. 4 is a front view of the detection head for the apparatus in FIG. 2, and

FIG. 5 is a side view of the head in FIG. 4.

DESCRIPTION OF PREFERRED EMBODIMENT

Figure 1:
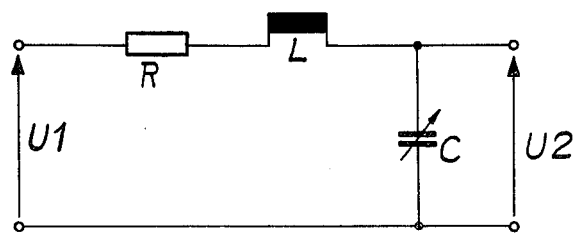
FIG. 1 is a diagram illustrating the detection principle.

The resonance circuit used for the detection is illustrated diagrammatically in FIG. 1. This series circuit comprises a resistor R, a self-induction coil L and an adjustably variable capacitor C. A voltage U1 having a frequency of 2 MHz is applied to this circuit. The voltage U2 is measured at the terminals of the capacitor C. The resonance frequency of the circuit is adjusted in order to differ slightly from 2 MHz, such that for a slight variation of the equivalent resistance of the circuit, one has a considerable variation of the current and consequently a considerable variation of the voltage U2. When a metal strand passes in the vicinity of the coil L, eddy current losses occur in the strand, which has the effect of increasing the value of the apparent resistance of the coil. The high frequency signal U2 is thus in some way modulated by the passage of the strand in front of the coil.

Figure 2:
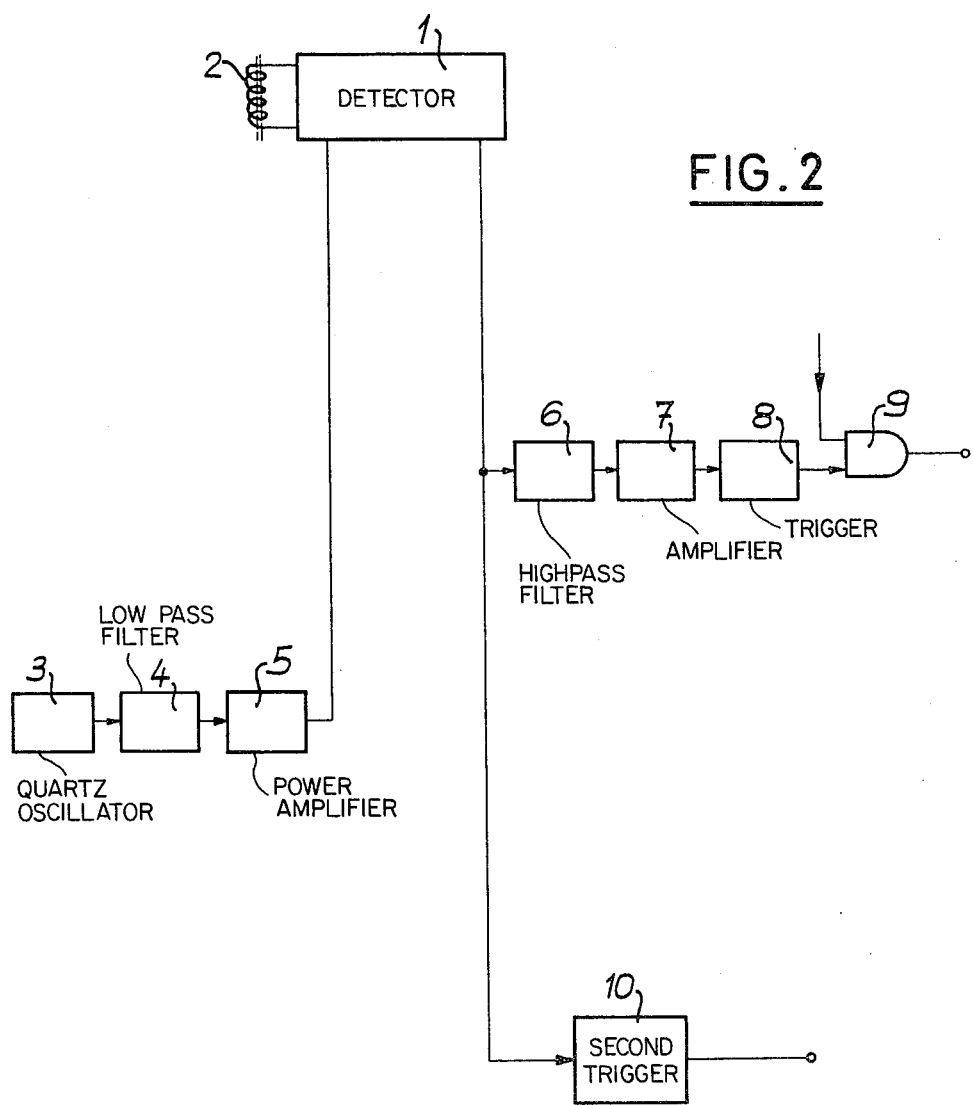
FIG. 2 is a block diagram of apparatus formed according to the second aspect of the invention for carrying out the method according to the first aspect.

A block diagram of detection apparatus for detecting the strand is illustrated in FIG. 2. This apparatus comprises a detector 1 comprising a resonance circuit of the type of FIG. 1, and a demodulation circuit and is provided with a detection head 2 constituted by a coil comprising a ferrite core. The resonance circuit is associated with a quartz oscillator 3 through a low-pass filter 4 and a power amplifier 5. The output of the detector 1 is applied, across a high-pass filter 6 and an amplifier 7, to a trigger 8 supplying a digital signal which is applied to an AND-gate 9 defining a reading window. The output of the detector is also applied to a second trigger 10 for checking the presence of the direct current component in the signal, a control which makes it possible to detect a possible rupture in the wire of the coil.

Figure 3:
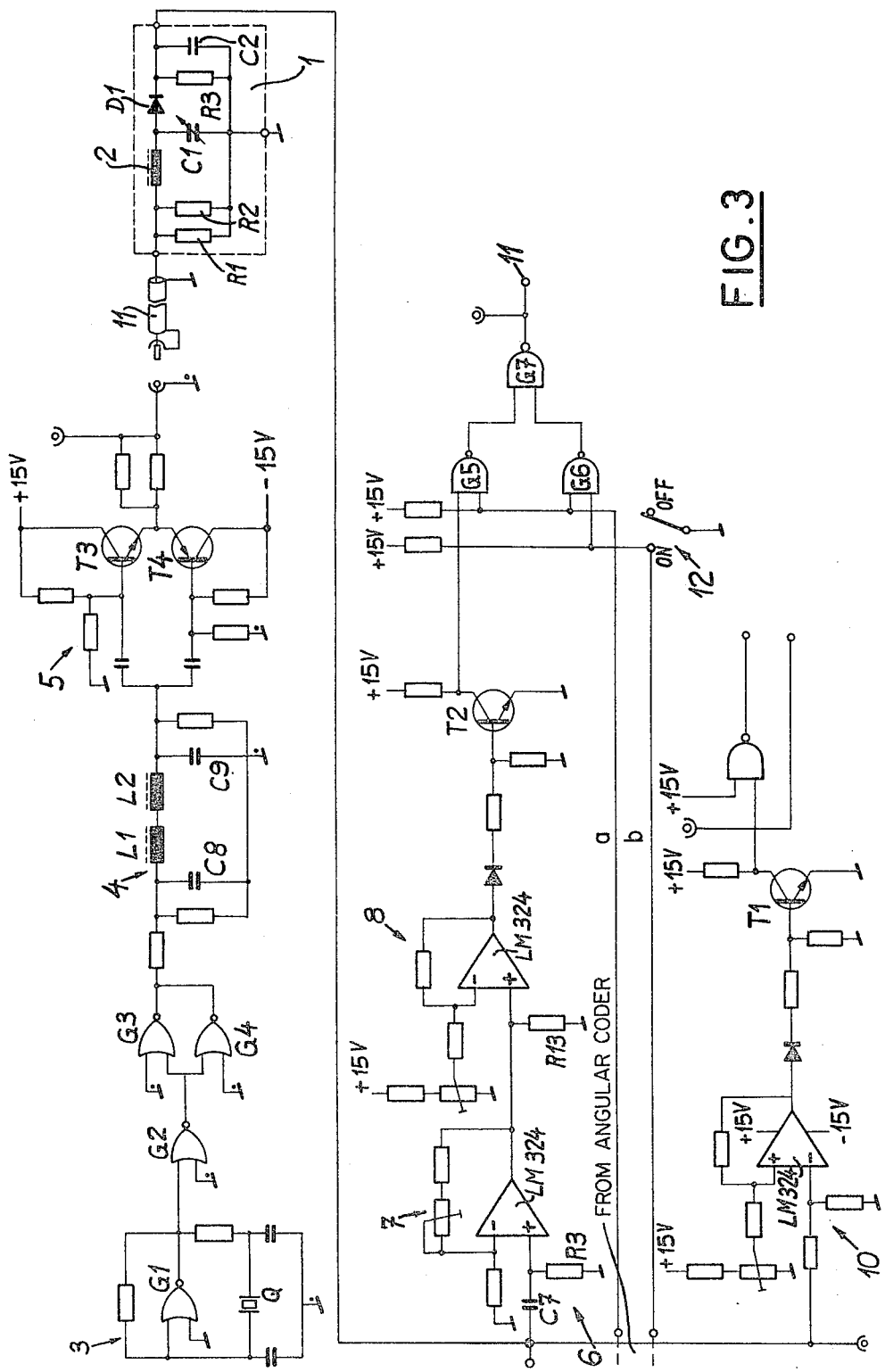
FIG. 3 shows in detail the circuit of the apparatus in FIG. 2.

The circuit of the apparatus of FIG. 2 is illustrated in detail in FIG. 3. The detector 1 comprises two resistors R1 and R2 for adapting the impedance to the impedance of the coaxial cable 11, the resonance circuit constituted by the coil 2 and variable capacitor C1 making it possible to adjust the resonance frequency, and a demodulation circuit constituted by a diode D1, a resistor R3 and a capacitor C2 forming a lowpass filter. The detection requires a high-frequency oscillator which is stable as regards time and temperature. For these reasons, the oscillator 3, producing a square wave signal, is formed with a quartz element Q and a NOR logic gate G1 constructed according to C-MOS technology. The square wave signal is also formed and controlled by a circuit of NOR-gates G2, G3 and G4. The square wave signal supplied by the oscillator has a voltage of 15 V and a frequency of 2 MHz. Owing to the fact that the oscillator provides a square wave output voltage and that a sinusoidal voltage is required, this signal is filtered by means of the low pass filter 4 in the form of the Greek letter $\pi$ constituted by self-induction coils L1 and L2 and capacitors C8 and C9. The power amplifier 5 (buffer) is formed by means of a push-pull stage (T3, T4) which provides a voltage of symmetrical output with respect to zero, having an amplitude of 1.75 V. The high-pass filter 6 is constituted by a capacitor C7 and a resistor R3. Its cut-off frequency is approximately 100 Hz. The amplifier 7 and the triggers 8 and 10 are formed conventionally by means of LM 324 circuits. The conversion of the C-MOS level is ensured respectively by means of two transistors T1 and T2.

The reading window is formed by three NAND gates G5, G6 and G7. The useful signal appears at the output 11. The reading window 9 makes it possible to validate the information received from the detectors over a predetermined period of time corresponding to a linear interval of the moving paper in which the strand to be detected is located. This reading window is formed in known manner by means of pulses from an angular coder connected to the device for moving the paper to be checked, which device comprises drums 20. The angular coder is connected by line a to one input of each of NAND gates G5 and G6 and by line b with the input of NAND gate G6. The other input of NAND gate G5 is connected to the output of the transistor T2. The outputs of NAND gates G5 and G6 are connected to the inputs of NAND gate G7. Hence, a signal from transister T2 can pass to the output 11 only when the NAND gates G5, G6 and G7 comprising the reading window are open under control of signals from the angular coder. In practice, the reading window makes it possible to eliminate any detection error and in the detection, to take into account not only the presence of a strand, but to take into account this presence at a predetermined point of the sheet of paper. A switch 12 makes it possible to start or stop the detector. In the ON position, one has information from the trigger during the reading window, whereas in the OFF position, in place of the pulses from the trigger, one has a pulse corresponding to the reading window.

The construction of the detector proper is illustrated in FIGS. 4 and 5. The detector comprises a box constituted by a support 13 and a lid 14. Mounted in this box is a printed circuit 15 comprising the components of the circuit 1 with the exception of the detection coil 2 located partially outside the box. The printed circuit comprises a connector 16.

What is claimed is:

1. Apparatus for detecting the presence of a metal strand in predetermined position in paper, comprising a detection head comprising a coil having a ferrite core forming part of a series resonance circuit, means for moving said paper past said detection head, power circuit means for supplying said resonance circuit with a filtered high frequency current having a fixed frequency close to the resonant frequency of said resonance circuit, means for demodulating high frequency voltage at terminals of said resonance circuit modulated by the passages of a metal strand in front of said coil, high-pass filter means for eliminating parasitic variations of the demodulated signal, means for amplifying said signal from high-pass filter means, trigger means for transforming an analog signal from said amplifying means into a digital signal, an output terminal, and means controlled by said paper moving means for providing a reading window only during the time that a predetermined portion of said paper containing said predetermined position is moving past said detection head, said means for forming a reading window passing a signal from said trigger means to said output terminal only if said signal occurs during said reading window.

2. Apparatus according to claim 1 in which said power circuit means includes means for supplying a direct current component to said coil, and in which second trigger means is connected in shunt before said high-pass filter means to detect the presence of a direct current component of the signal to thereby check the continuity of said coil.

3. Apparatus according to claim 1 or 2, in which said means for forming a reading window comprises an angular coder connected to said means for moving said paper past said detection head and gate means controlled by said angular coder, said gate means controlling the passing of a signal from said trigger means to said output terminal.

* * * * *